United States Patent [19]

Miller et al.

[11] Patent Number: 5,080,857
[45] Date of Patent: Jan. 14, 1992

[54] PASSIVE LOWER DRYWELL FLOODER

[75] Inventors: Gail E. Miller; Craig D. Sawyer, both of Los Gatos, Calif.

[73] Assignee: General Electric Company, San Jose, Calif.

[21] Appl. No.: 409,371

[22] Filed: Sep. 19, 1989

[51] Int. Cl.⁵ .............................................. G21C 9/00
[52] U.S. Cl. ................................. 376/280; 376/284
[58] Field of Search ...................... 376/280, 279, 284

[56] References Cited

U.S. PATENT DOCUMENTS

| | | | |
|---|---|---|---|
| 3,607,630 | 9/1971 | West et al. | 376/280 |
| 3,678,920 | 7/1972 | Cohen et al. | 376/280 |
| 4,045,284 | 8/1977 | Rosewell | 376/280 |
| 4,146,429 | 3/1979 | Slagley | 376/280 |
| 4,442,065 | 4/1984 | Latter et al. | 376/280 |
| 4,696,791 | 9/1987 | Straub | 376/282 |

Primary Examiner—Daniel D. Wasil
Attorney, Agent, or Firm—Robert R. Schroeder

[57] ABSTRACT

A nuclear reactor complex includes fusible plugs to prevent water from a wetwell from flowing into a drywell including the reactor vessel. In case the core overheats and molten corium falls to the drywell floor, the heat from the corium melts the fusible plugs and water floods the drywell. The water inhibits a corium-concrete reaction, minimizing pressure increase within the drywell and thus the chances of radioactive materials being released into the environment.

7 Claims, 3 Drawing Sheets

PASSIVE LOWER DRYWELL FLOODER

BACKGROUND OF THE INVENTION

The present invention relates to fission reactors and, more particularly, to safety mechanisms for such reactors. A major objective of the present invention is to limit corium-concrete outgas reactions upon meltdown.

Nuclear fission reactors promise to provide abundant energy with far less strain on the environment than fossil fuels. However, due to the toxicity of radioactive and other fission products, it has proved necessary to integrate several levels of back-up and safety systems into each reactor complex.

Water-cooled reactors typically include a reactor core which generates heat through fission. Recirculating water, in liquid and vapor phase, is used to transfer heat from the core to an electricity-generating turbine, or other destination. The reactor core is enclosed by a reactor vessel, which confines the recirculating fluid. The vessel itself is enclosed in a drywell, which is usually constructed with concrete walls and floor. Control rods and other reactor components extend from the vessel toward the drywell floor. The drywell is kept substantially dry to limit corrosion to these components, the vessel, and the concrete.

One of the more dramatized scenarios with which a reactor complex must be prepared to cope is a meltdown of the core when core cooling systems fail. Corium, the resulting molten material which can be at about 5000° C., can breach the reactor vessel and fall to the drywell floor. The corium can react with the concrete resulting in a rapid generation of carbon dioxide and hydrogen by-products, as well as radioactive gases. The generated gas can build up pressure within the drywell, which can burst open. In this event, gaseous and particulate fission products would be released.

The corium-concrete reaction, and concomitantly its adverse affects, can be mitigated by timely flooding the drywell with water, or other coolant. Many reactor complexes include leak detection systems in the drywell which can provide early warning of a corium breach. Alteratively, temperature sensors, either within the vessel or outside the vessel and within the drywell can be used to anticipate or detect a corium breach.

The sensor data can be provided to a human operator who can then open a valve to an adjacent water reservoir. To avoid a potential for human error, feedback from a sensor can be used directly to control such a valve. However, there are still risks that the sensor or the control system or the valve itself may fail. What is needed is a system for impeding the corium-concrete reaction which is inherently less subject to failure than those discussed above.

SUMMARY OF THE INVENTION

In accordance with the present invention, a reactor complex includes fusible-metal containing obstruction assemblies to block coolant flow from a reservoir to a drywell. The obstruction assemblies are designed so that when the fusible metal melts, water or other coolant can flow freely into the drywell, mitigating the corium-concrete reaction or other corium based reaction. Heat from corium falling onto the drywell floor will melt the fusible metal so that the drywell is flooded, corium reactions are impeded, gas pressure with the vessel maintained at tolerable levels, and danger to the environment minimized.

A fusible metal is defined herein as a metal which liquifies at a temperature between 400° F. and 700° F. Solder is a widely known example of a fusible metal. Preferably, a reactor complex would employ multiple conduits, each with a respective obstruction assembly. Different fusible metals can be used for the different conduits to minimize the likelihood of multiple failures. In each case, the metal should be chosen so that it does not melt unless corium enters the drywell. The melting temperatures should be low enough to guarantee melting when corium does enter the drywell. The sensitivity of the fusible metal to the presence of corium temperatures can be enhanced by ensuring that the fusible metal is thermally insulated from the water from the reservoir.

In one realization of the invention, the fusible metal is used as a plug in a conduit extension pipe to a water reservoir. The conduit extension is affixed to a conduit through the drywell wall. During fabrication, fusible metal can flow into an annular groove in the pipe to anchor the plug's position within the pipe. An insulating disk is disposed between the plug and the water so that the relatively low water temperatures do not impede plug melting during a corium breach. A plastic cap can cover the pipe so that the plug is less subject to corrosion and so that toxic components, e.g., lead, released from the plug do not escape during normal operation.

In another realization of the present invention, a plate is bolted onto a flange of the conduit. An o-ring seal can be used to prevent water from leaking between the plate and the flange and into the drywell. The bolt head is spaced from the flange by a collar of fusible metal, while a nut threaded onto the bolt, forces the plate against the flange. In this case, the flange and intermediate ambient atmosphere insulate the fusible metal from the water in the conduit. During a corium breach, the fusible metal collars melt, and the plate drops away from the conduit flange. This allows water to flood into the drywell.

The use of an obstruction assembly which releases when its fusible metal components melt obviates the need for operator intervention, separate sensors, intervening control systems and mechanically actuated valves. Accordingly, the risks of operator inattention or error, sensor malfunction, controller malfunction, and mechanical valve failure are essentially avoided. These and other features and advantages of the present invention are apparent from the description below with reference to the following drawings.

DESCRIPTION OF THE PREFERRED EMBODIMENTS

Figure 1:
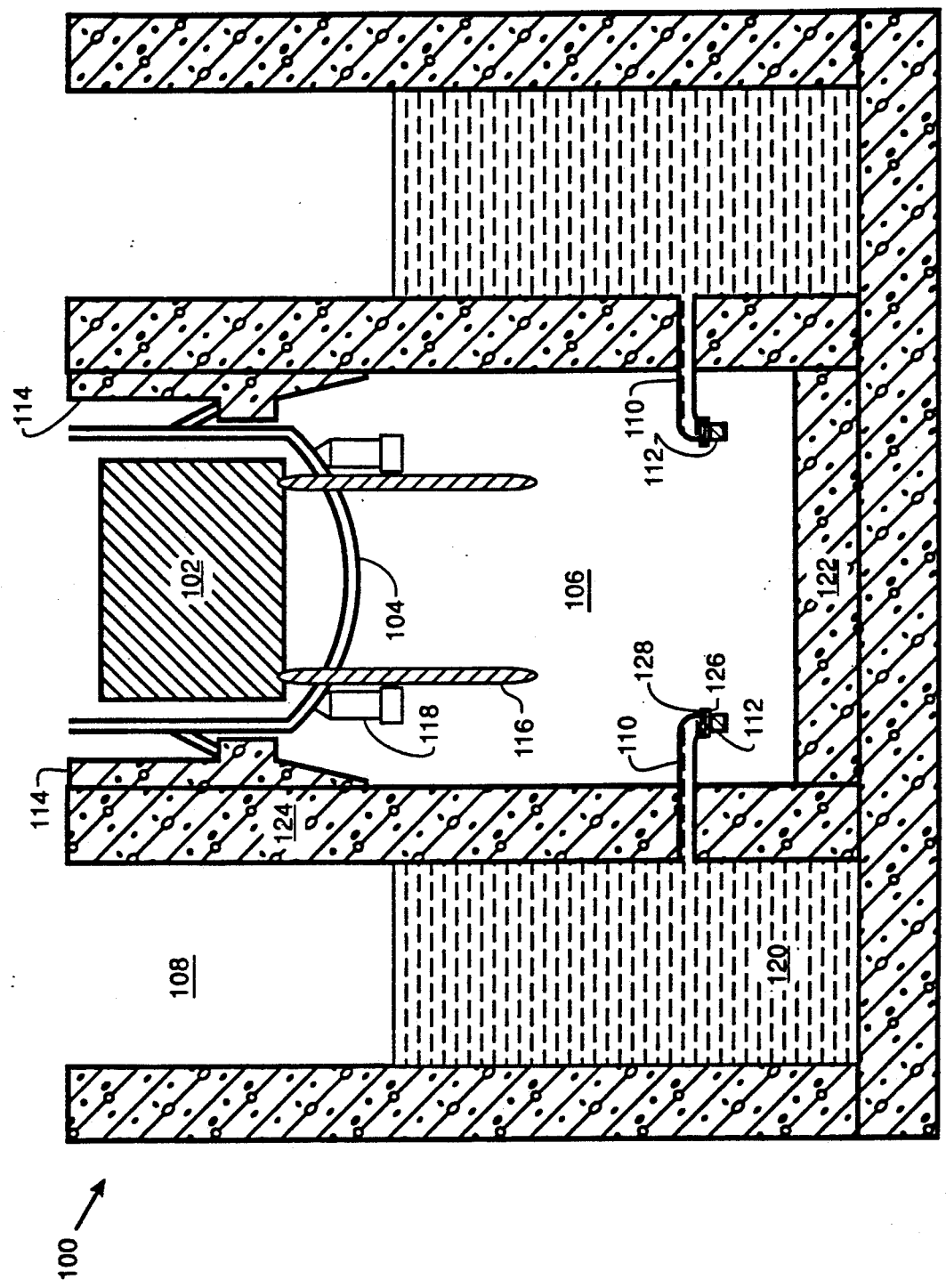
FIG. 1 is a schematic illustration of a reactor complex in accordance with the present invention.

In accordance with the present invention, a reactor complex 100 includes a reactor core 102, a reactor vessel 104, a drywell 106, wet wells 108, conduits 110 and obstruction assemblies 112. Mounting fixtures 114 maintain the position of reactor vessel 104 within drywell 106. Control rods 116 and other reactor components 118 extend downward from reactor vessel 104 into drywell 106. Wetwells 108 hold water 120 to a level well above the level of conduits 110, which are sufficiently above drywell floor 122 so that obstruction assemblies 112 are not blocked by corium in the case of an accident. Conduits 110 extend through drywell walls 124 and are themselves filled with water 120 from wetwells 108. Obstruction assemblies 112 prevent water 120 in conduits 110 and wetwells 108 from flowing into drywell 106. Obstruction assemblies 112 have flanges 126 which are bolted to flanges 128 of conduits 112 for attachment thereto.

Figure 2:
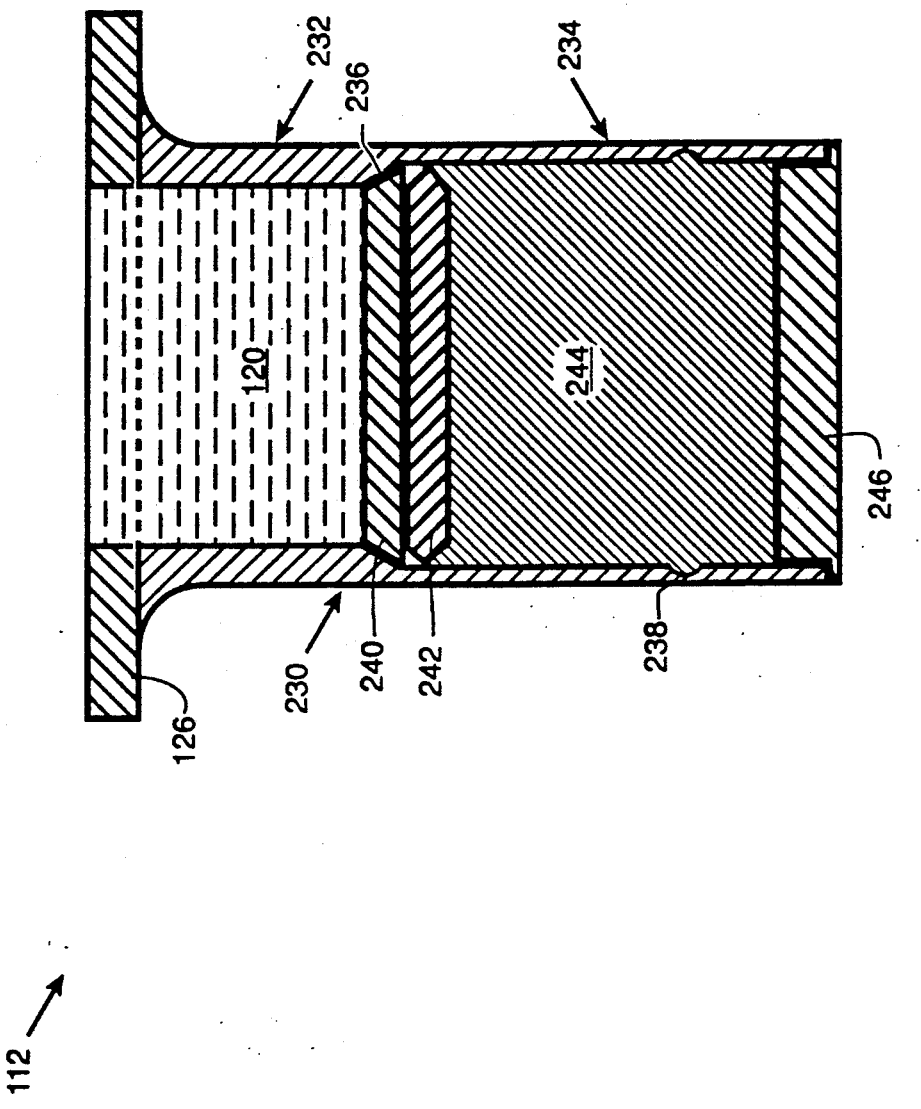
FIG. 2 is a sectional view of an obstruction assembly of the complex of FIG. 1.

Each obstruction assembly 112 includes a tubular conduit extension pipe 230 as a housing, as shown in FIG. 2. Stainless steel flange 126 is welded to pipe 230 so that assembly 112 can be mounted to conduit 110. Pipe 230 includes a narrower section 232 and a wider section 234 so as to define an inverted and angled seat 236. An annular groove 238 is formed in wider section 234. A stainless steel disk 240 is mounted at seat 236. A Teflon disk 242 is disposed next to disk 240, and a fusible metal plug 244 is formed over Teflon disk 242. A protective cap 246 is mated with the bottom end of pipe 230. Water 120 from wetwell 108 and conduit 110 fills narrower section 232.

Steel disk 240 blocks water 120 so that it does not contact plug 244. Teflon disk 242 thermally insulates plug 244 from the cooling effects of water 120. Any small amount of water contacting plug 244 can be boiled away in the event of a corium breach. In the event of a corium breach, plastic cap 246 burns off; fusible plug 244 heats, melts and pours out of pipe 230; Teflon disk 242 and steel disk 240 fall out of pipe 230. Water 120 then floods drywell 106.

There are ten obstruction assemblies, one for each of ten conduits (two of which are shown in FIG. 1). Obstruction assembly 112 can be replaced by lowering the water level in wetwell 108 to below the level of conduit 110, or by inserting a temporary plug from the wetwell side of conduits 110. Pipe 230 is a 4.00" long schedule 80 stainless steel pipe. Pipe 230 has an outer diameter of 6.50". Narrower section 232 has an inner diameter of about 5.00", while wider section 234 has an inner diameter of about 5.80". Annular groove 238 is about 0.08" deep. Seat 236 is formed at a 45° relative to the section walls.

Stainless steel disk 240 is approximately 0.25" thick and shaped so as to conform to seat 236. Its main purpose is to keep water 120, which it contacts, in conduit 110 from contacting plug 112. The outer diameter of disk 240 is about 5.5", which is small enough that it will fall out of pipe 230 when plug 244 melts.

Teflon (tetrafluoroethylene) disk 242 serves as thermal insulation to keep water 120 in conduit 110 from cooling plug 244. Teflon's melting point is higher than that of plug 244, so it retains its integrity at least until plug 244 melts and it falls to drywell floor 122. Teflon disk 242 is made from a Teflon sheet; its edges are rounded to permit water 120 to push it out of pipe 230 when plug 244 melts.

Plug 244 consists of a mixture of two or more metals from the following set: lead, tin, silver, bismuth, antimony, tellurium, zinc, copper, etc. Different mixtures are used in the ten obstruction assemblies 112 to reduce the changes of a common failure. The preferred melting points are about 500° F. More generally, the range of melting points is between 400° F. and 700° F. Different values would apply to different reactor complexes. The melting point should be low enough to ensure melting in case of a corium breach, and high enough to preclude melting in the absence of a corium breach.

Plastic cover 246 is made of Saran (available from Dow Chemical), so that it melts at a much lower temperature than plug 244. Plastic cover 246 prevents release of the metals, e.g., lead, of plug 244 during normal operating conditions. This permits using metals which may be considered undesirable under uncontrolled conditions. A wide variety of alternative cover materials can be used for the above purpose. Any toxicity of the plug will be deminimus in the event of a corium breach.

Fabrication of obstruction assembly 112 begins with welding flange 126 to pipe 230. Wider section 238 is machined to create its larger inner diameter. One end of wider section 238 is machined to form seat 236 at a predetermined angle, e.g., 45°; then, annular groove 238 is machined. Pipe 230 is then oriented vertically, with wider section 234 up, opposite to its orientation in use and opposite to the illustrated orientations. Stainless steel disk 240 is inserted through wider section 234 so that it rests on seat 236. Teflon disk 242 is inserted into wider section 234 so that it rests on stainless steel disk 240. Fusible metal is melted, poured into pipe 230, and allowed to cool to form plug 244. Fusible metal conforming to groove 238 serves to anchor plug 244 in pipe 230. Plastic cover 246 is added. Attachment of obstruction assembly 112 involves inverting it to the orientation of FIGS. 1 and 2 and sealing and bolting it to flange 128 of conduit 110.

Optionally, the obstruction assembly flange can be of any suitable material which is corrosion resistant and compatible with the drywell environment. The size of the flange depends on the number of pipes in the lower drywell flooding system and the rate at which water is to be added to the lower drywell. The pipes can alternatively be fabricated of machinable corrosion resistant material that can be welded to the flange. The angle or shape of seat can be varied. The stainless steel disk must then be shaped to conform with the seat, or a seal, such as an o-ring seal can be used.

The seated disk can be of a metal different from the pipe, but care must be taken to avoid galvanic corrosion. A non-metallic disk can be used, such as of Teflon, in which case a separate insulator disk need not be used. The disk and the inside of the pipe can be coated with epoxy which will fail when the plug melts.

The insulator disk should provide adequate thermal insulation and be removable when the plug melts. Sand or fire brick are alternative insulating materials. The insulator can be much thicker than 0.25", as required.

The plug need not melt completely. It is sufficient that the outer layer melt to allow the plug to be forced out of the pipe. Accordingly, the plug can include a core of different material than its outer surface. A wide variety of plug thicknesses are provided for.

The number and depth of grooves can be varied widely. The grooves give additional strength to the plug at low temperatures. The wall thickness is smallest at the grooves so that the fusible metal in the grooves will melt quickly to release the plug. The plastic cover can be made of any material, including a metal, which will melt, decompose or otherwise offer little resistance to a loosened plug.

Figure 3:
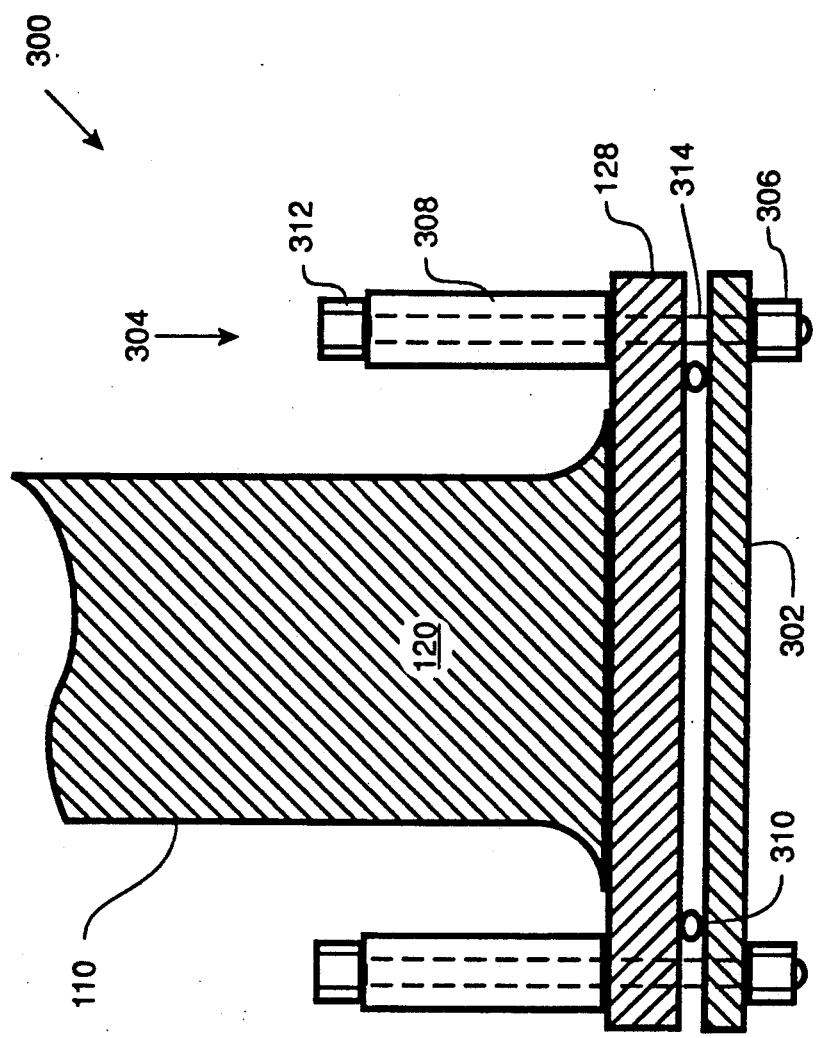
FIG. 3 is a sectional view of an alternative obstruction assembly attached to an alternative conduit incorporable in the reactor complex of FIG. 1.

The present invention also provides for embodiments in which fusible metal is used, but not as a plug. An alternative obstruction assembly 300 is shown in FIG. 3 mounted to flange 128 of a conduit 110. Assembly 300 comprises a plate 302, or blind flange, bolts 304, nuts 306, collars 308 and an o-ring 310. Collars 308 are of fusible metal and serve to space bolt heads 312 of bolts 304 from flange 128. Upon a corium breach, collars 308 melt and plate 302 and nuts 306 drop until bolt heads 312 contact flange 128. Water 120 is free to flow through conduit 110 to the drywell below. Note that plate 302 is designed with apertures 314 away from conduit 110 so that bolts 304, and thus fusible collars 308, are spaced from water 120 in conduit 110. Thus, plate 302 and flange 128 serve as means for thermally insulating collars 308.

Once again, different materials and dimensions are provided for. Those skilled in the art will recognize that there are a variety of structures which would provide for opening a conduit by melting fusible metal in an obstruction assembly. For example, the fusible metal could be brazing material used to bond a metal cap to a conduit. The present invention applies to reactors that have control rods above the reactor vessel and/or below the reactor vessel. Embodiments are provided in which no components extend downward from the vessel as well as embodiments in which one or more components extend downward from the reactor vessel. The number of conduits and obstructions assemblies can be one, two or any greater number, depending of the drywell design. The conduits can have a range of diameters, lengths and materials. The obstruction assembly components, e.g., the plug, disks, pipe, bolts, collars, can have different dimensions, geometries and material compositions. These and other variations upon and modifications to the disclosed embodiments are provided for by the present invention, the scope of which is limited only by the following claims.

What is claimed is:

1. A system comprising:
   a drywell including a drywell floor and a drywell wall;
   a reactor vessel at least partially within said drywell so as to define a lower drywell volume below said reactor vessel and above said drywell floor;
   a fission reactor core contained by said reactor vessel;
   a liquid reservoir containing a coolant liquid, said liquid having a liquid level above said drywell floor;
   a conduit extending from said reservoir below said liquid level through said drywell wall and into said lower drywell means; and
   an obstruction assembly, said assembly having a normal condition in which it obstructs liquid from flowing from said reservoir into said lower drywell volume, said obstruction assembly being coupled to said conduit for obstructing liquid flow, said obstruction assembly including fusible metal arranged so that when it melts liquid can flow from said reservoir into said lower drywell volume so that,
   when said core melts and contacts said drywell floor, said fusible metal melts so that coolant liquid flows into said drywell, inhibiting outgas generating reactions.

2. The system of claim 1 wherein said obstruction assembly further includes spacer means for thermally insulating said fusible metal from said liquid.

3. The system of claim 2 wherein said obstruction includes a conduit extension having a cross section, fusible metal is disposed within said conduit extension as a plug filling said cross section, said spacer means also being disposed within said plug and between said fusible metal and said coolant liquid, said spacer means consisting of thermally insulating material.

4. The system of claim 2 wherein:
   said conduit includes a flange;
   said obstruction assembly includes a plate, bolts, nuts, said fusible metal being in the form of bolt collars, each bolt extending sequentially through a respective bolt collar, said flange, and said plate and at least partially through a respective nut so that said plate is sealed against said flange so that liquid cannot flow into said drywell; and
   whereby, when said fusible metal melts, said plate separates from said flange so liquid can flow through said conduit and into said drywell.

5. The system of claim 4 wherein said obstruction assembly further includes an o-ring seal between said flange and said plate.

6. A system comprising:
   a drywell including a drywell floor and a drywell wall;
   a reactor vessel at least partially within said drywell;
   a fission reactor core contained by said reactor vessel;
   a liquid reservoir containing a coolant liquid, said liquid having a liquid level above said drywell floor;
   a conduit extending from said reservoir below said liquid level through said drywell wall and into said drywell, said conduit including an annular groove; and
   an obstruction assembly, said assembly having a normal condition in which it obstructs liquid from flowing from said reservoir into said drywell, said obstruction assembly being coupled to said conduit for obstructing liquid flow, said obstruction assembly including fusible metal arranged so that when it melts liquid can flow from said reservoir into said drywell, said fusible metal engaging said annular groove so that said fusible metal is secured within said conduit extension until melted;
   whereby, when said core melts and contacts said drywell floor, said fusible metal melts so that coolant liquid flows into said drywell, inhibiting outgas generating reactions.

7. The system of claim 6 wherein said obstruction assembly includes a cap disposed on said conduit extension so that said fusible metal is between said cap and said spacer means;
   whereby said cap protects said fusible metal from corrosion.

* * * * *